US 6,630,656 B2

(12) United States Patent
Wirth

(10) Patent No.: US 6,630,656 B2
(45) Date of Patent: Oct. 7, 2003

(54) METHOD AND APPARATUS FOR WAVEFRONT MEASUREMENT THAT RESOLVES THE 2-π AMBIGUITY IN SUCH MEASUREMENT AND ADAPTIVE OPTICS SYSTEMS UTILIZING SAME

(75) Inventor: Allan Wirth, Bedford, MA (US)

(73) Assignee: Adaptive Optics Associates, Inc., Cambridge, MA (US)

(*) Notice: Subject to any disclaimer, the term of this patent is extended or adjusted under 35 U.S.C. 154(b) by 0 days.

(21) Appl. No.: 09/906,388

(22) Filed: Jul. 16, 2001

(65) Prior Publication Data
US 2002/0030824 A1 Mar. 14, 2002

Related U.S. Application Data

(63) Continuation-in-part of application No. 09/766,211, filed on Jan. 19, 2001.
(60) Provisional application No. 60/218,190, filed on Jul. 14, 2000.

(51) Int. Cl.[7] .............................................. G02B 23/00
(52) U.S. Cl. ...................... 250/201.9; 356/121; 356/512
(58) Field of Search ............................ 250/201.9, 332; 356/512–516, 521, 121; 359/846, 849

(56) References Cited

U.S. PATENT DOCUMENTS

| 4,141,652 A | 2/1979 | Feinleib |
| 4,248,504 A | 2/1981 | Albertinetti et al. |
| 4,257,686 A | 3/1981 | Albertinetti et al. |
| 4,399,356 A | 8/1983 | Feinleib et al. |
| 4,474,467 A | 10/1984 | Hardy et al. |
| 4,696,573 A | 9/1987 | Hutchin |
| 4,725,138 A | 2/1988 | Wirth et al. |
| 4,737,621 A | 4/1988 | Gonsiorowski et al. |
| 5,093,563 A | 3/1992 | Small et al. |
| 5,113,064 A | 5/1992 | Manhart |
| 5,317,389 A * | 5/1994 | Hochberg et al. ............ 356/497 |
| 5,493,391 A | 2/1996 | Neal et al. |
| 5,629,765 A | 5/1997 | Schumtz |
| 5,798,878 A | 8/1998 | Asari et al. |
| 5,864,381 A | 1/1999 | Neal et al. |
| 5,912,731 A | 6/1999 | DeLong et al. |

(List continued on next page.)

FOREIGN PATENT DOCUMENTS

WO    WO 97/21989    6/1997    ............. G01J/9/00

OTHER PUBLICATIONS

Web–based publication entitled "Absolute Distance Interferometry" by the Institute of Physics at E.M. Arndt University, http://www2.physik.uni-greifswald.de/laser/forschung/adi eng.html, 2001, pp. 1–3.

(List continued on next page.)

Primary Examiner—Stephone B. Allen
(74) Attorney, Agent, or Firm—Thomas J. Perkowski, Esq., P.C.

(57) ABSTRACT

An improved wavefront sensor for characterizing phase distortions in incident light including optical elements that spatially sample the incident light and form a dispersed spot with a fringe pattern corresponding to samples of the incident light. An imaging device captures an image of the dispersed spot with said fringe pattern formed by said optical elements. And an image processor that analyzes the spectral components of the fringe pattern of a given dispersed spot to derive a measure of the local phase distortion without ambiguity in the corresponding sample of incident light. The optical elements may comprise refractive elements, diffractive elements or a combination thereof (such as a grism). The wavefront sensor may be part of an adaptive optic system (such as a large-aperture space telescope) to enable the measurement and correction of large phase steps across adjacent mirror segments of a deformable mirror.

27 Claims, 15 Drawing Sheets

U.S. PATENT DOCUMENTS

| | | | |
|---|---|---|---|
| 5,936,720 A | | 8/1999 | Neal et al. |
| 6,052,180 A | | 4/2000 | Neal et al. |
| 6,108,121 A | | 8/2000 | Mansell et al. |
| 6,113,242 A | | 9/2000 | Marker et al. |
| 6,130,419 A | | 10/2000 | Neal |
| 6,163,381 A | * | 12/2000 | Davies et al. ............... 356/521 |
| 6,184,974 B1 | | 2/2001 | Neal et al. |
| 6,278,100 B1 | * | 8/2001 | Friedman et al. ......... 250/201.9 |

OTHER PUBLICATIONS

Chapter 1 of AOA's WaveScope System User Manual entitled "System Overview" by Adaptive Optics Associates, Inc., http://www.aoainc.com/technologies/adaptiveandmicrooptics/wavescope/CHAP6.html, 2001, pp. 1–5.

Chapter 4 of AOA's WaveScope System User Manual entitled "Alignment" by Adaptive Optics Associates, Inc., http://www.aoainc.com/technologies/adaptiveandmicroptics/wavescope/Alignment.htm, 2001, pp. 1–25.

Chapter 5 of AOA's WaveScope System User Manual entitled "Calibration" by Adaptive Optics Associates, Inc., http://www.aoainc.com/technologies/adaptiveandmicrooptics/wavescope/Calibration., 2001, pp. 1–23.

Chapter 8 of AOA's WaveScope System User Manual entitled "Basic Theory of Hartmann Sensing" by Adaptive Optics Associates, Inc., http://www.aoainc.com/technologies/adaptiveandmicrooptics/wavescope/CHAP2.html, 2001, pp. 1–5.

Textbook entitled "Introduction to Adaptive Optics" by Tyson, Tutorial Texts in Optical Engineering, SPIE Press, vol. TT41,2000, pp. 1–117.

Web–based Publication entitled "Low–Cost Adaptive Optics" by University of Edinburgh et al., http://op.ph.ic.ac.uk/ao/locado.html, Mar. 1999, pp. 1–3.

Web–based Publication entitled "Two–frequency phase–shifting projection moire topography" by Kim et al., http://www.spie.org/web/abstracts/3500/3520.html, vol. 3520, 1998, pp. 36–42.

Web–based publication entitled "Interferometer satellite synthetic aperture radar and its application to the observation of Greenland ice sheet motion" by Frick, http://www.icg.tu–graz.ac.at/Education/Diplomarbeiten/1996/frick, 1996, pp. 1–2.

Textbook entitled "Introduction to Wavefront Sensors" by Geary, Tutorial Texts in Optical Engineering, vol. TT18, SPIE Optical Engineering Press, 1995, pp. 1–169.

Search Report for International Application No. PCT/US01/22281, 2001.

* cited by examiner

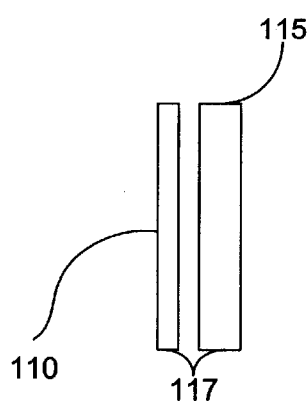
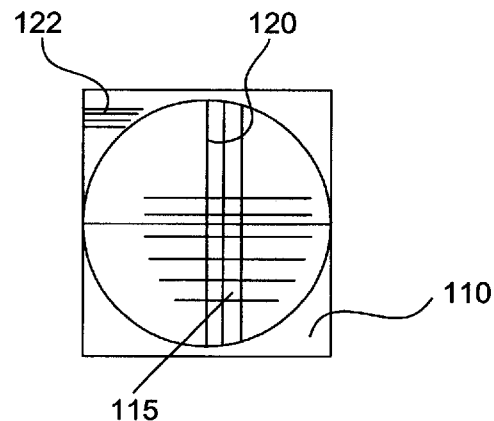
FIG. 4A          FIG. 4B
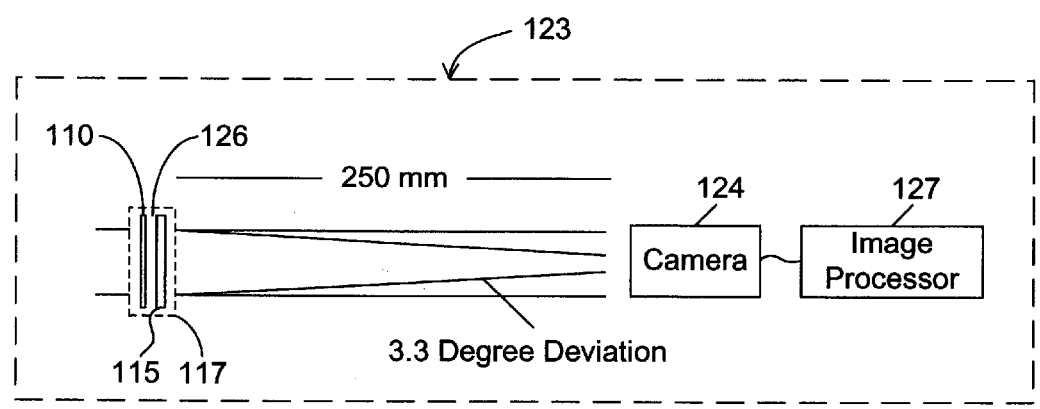
FIG. 5

METHOD AND APPARATUS FOR WAVEFRONT MEASUREMENT THAT RESOLVES THE 2-π AMBIGUITY IN SUCH MEASUREMENT AND ADAPTIVE OPTICS SYSTEMS UTILIZING SAME

CROSS-REFERENCE TO RELATED APPLICATIONS

This application claims priority from U.S. Provisional Application Ser. No. 60/218,190 filed Jul. 14, 2000, and U.S. application Ser. No. 09/766,211 filed Jan. 19, 2001, herein incorporated by reference in their entirety.

FIELD OF THE INVENTION

This invention relates to wavefront sensors that measure and characterize the phase error in wavefronts, and adaptive optics systems, such as large aperture space telescopes, that utilize wavefront sensors to measure and compensate for phase errors (caused primarily by atmospheric turbulence) in the wavefronts captured therein, thereby overcoming the blurring in images that would otherwise be caused by such phase errors.

BACKGROUND OF THE INVENTION

An adaptive optics system automatically corrects for light distortions in the medium of transmission. For example, if you look far down a road on a very hot and sunny day, you will often see what is usually called a mirage. What you are seeing is the response of the rapidly changing temperature in the air causing it to act like a thick, constantly bending lens. As another example, the twinkling of stars is due to the atmosphere surrounding the Earth. Although twinkling stars are pleasant to look at, the twinkling causes blurring on an image obtained through a telescope. An adaptive optics system measures and characterizes the phase distortion of a wavefront of light as it passes through the medium of transmission (and the optical components transmitted therealong) and corrects for such phase distortion using a deformable mirror (DM) controlled in real-time by a computer. The device that measures and characterizes the phase distortions in the wavefront of light is called a wavefront sensor.

In an adaptive optics based large-aperture space telescope 11, as illustrative in FIG. 1, light from a nominal point source above the atmosphere enters the primary mirror 13 of the telescope 11 and is focused and directed by mirrors 14A and 14B to an adaptive optics subsystem 15. The adaptive optics subsystem 15 includes a tilt mirror 17 and a deformable mirror 19 disposed between its source (the mirrors 14A and 14B) and an imaging camera 31 and capturing an image of the point source. A beam splitter 21 directs a portion of the light directed to the imaging camera by the mirrors 17, 19 to a wavefront sensor 23 that measures the phase distortion in the wavefronts of light directed thereto. A computer 25 cooperates with mirror driver 27A to control the tilt mirror 17 to stabilize the image, and cooperates with the mirror driver 27B to control the deformable mirror 19 to compensate for the phase distortions measured in the wavefront of the incident light forming the image, thereby restoring sharpness of the image lost to atmospheric turbulence. In recent years, the technology and practice of adaptive optics have become well-known in the astronomical community.

The most commonly used approach in the wavefront sensor 23 is the Shack-Hartmann method. As shown in FIG. 2, this approach is completely geometric in nature and so has no dependence on the coherence of the sensed optical beam. The incoming wavefront is broken into an array of spatial samples, called subapertures of the primary aperture, by a two dimensional array of lenslets. The subaperture sampled by each lenslet is brought to a focus at a known distance F behind each array. A two dimensional detector array (e.g., such as a CCD imaging device or CMOS imaging device) captures an image of the focal spots, and computer-based image processing routine tracks lateral position of such spots. Because the lateral position of the focal spot depends on the local tilt of the incoming wavefront, a measurement of all the subaperture spot positions provides a measure of the gradient of the incoming wavefront. A computer-based two-dimensional integration process called reconstruction can then be used to estimate the shape of the original wavefront, and from the complex conjugate thereof derive the correction signals for the deformable mirror (and the tilt mirror) that compensate for the measured phase distortions.

In the Shack-Hartmann method, measurement inaccuracies due to optical distortion or misalignment of the sensor's optics are minimized by combining the received wavefront with an internal reference laser wavefront upstream of the lenslet array and measuring subaperture tilt/tip as the difference in spot position between the two waves. Since the reference wave suffers no atmospheric distortion, any displacement of the reference wave's subaperture spot position from that of the subaperture's chief ray is attributable to sensor distortion. The differential spot position between the two waves, therefore, provides an accurate measure of the received wavefront's distortion. The Shack-Hartmann sensor is more tolerant of vibration and temperature conditions which, together with its simplicity, allows it to be used in a greater number of adaptive optic applications outside of the laboratory.

However, the Shack-Hartmann method is sensitive to a phase step across the subaperture. Such a phase step may be introduced, for example, if the subaperture bridges the gap between the two segments of a mirror. If a phase step is introduced across the subaperture, the far-field spot formed by the aperture will take on the form of an unaberrated spot combined with a fringe pattern. For any given wavelength, this fringe pattern shifts with changing phase difference, but the pattern repeats for every one wavelength change in phase difference. This is commonly referred to as a 2π ambiguity in phase difference. Importantly, this 2π ambiguity leads to measurement errors for large phase steps.

In large aperture space telescopes, course adjustment is required to correct for large phase steps that are initially present within the system. As described above, the Schack-Hartmann method cannot accurately measure such large phase steps.

In addition, because the Schack-Hartmann method cannot accurately measure large phase steps, it is difficult and expensive to design and build Shack-Hartmann wavefront sensors that can operate effectively in highly turbulent transmission mediums. Such sensors require complex and costly components that provide for high sampling frequencies to ensure that the phase step between two successive sampling periods is within the dynamic range of the instrument.

Thus, there is a great need in the art for an improved wavefront sensing mechanism that avoids the shortcomings and drawbacks of prior art Schack-Hartmann wavefront sensors.

OBJECTS AND SUMMARY OF THE INVENTION

Accordingly, a primary object of the present invention is to provide an improved wavefront sensor that is free of the shortcomings and drawbacks of prior art wavefront sensors.

Another object of the present invention is to provide an improved wavefront sensor that is capable of measuring large phase steps in a wavefront without ambiguity (i.e., with the 2π ambiguity resolved).

Another object of the present invention is to provide an improved wavefront sensor that provides the benefits inherent in Shack-Hartmann sensing, including high tolerance to vibration and temperature variations.

Another object of the present invention is to utilize dispersed fringe techniques over multiple subapertures of a pupil plane of the wavefront sensor to form far-field fringe patterns corresponding to the subapertures.

Another object of the present invention is to utilize image processing techniques to analyze far-field fringe patterns corresponding to the subapertures of the wavefront sensor in order to derive a measure of the local phase distortion without ambiguity in the sample of incident light corresponding the subapertures.

Another object of the present invention is to integrate an improved wavefront sensor capable of measuring large phase steps without ambiguity, into an adaptive optic subsystem and systems (such as a large aperture space telescope).

Another object of the present invention is to provide an improved space telescope embodying an adaptive optics subsystem capable of measuring and correcting large wavefront phase errors free of 2π resolution ambiguity.

These and other objects of the present invention will become apparent hereinafter and in the Claims to Invention.

DESCRIPTION OF THE DRAWINGS

For a more complete understanding of the present invention, the following Detailed Description of the Illustrative Embodiment should be read in conjunction with the accompanying Drawings.

FIG. 4A shows a side schematic view of exemplary optical elements (i.e. a transmission grating and lens array) employed in the wavefront sensor of the present invention, wherein the optical elements spatially sample incident light, form far-field spots corresponding to samples of the incident light, and disperse the fringe pattern of such spots onto an electronic image sensor (i.e. camera).

FIG. 4B shows a top schematic view of the exemplary optical elements shown in FIG. 4A.

FIG. 5 shows a side view of the improved wavefront sensor of the present invention.

DETAILED DESCRIPTION OF THE PREFERRED EMBODIMENT

Figure 1A:
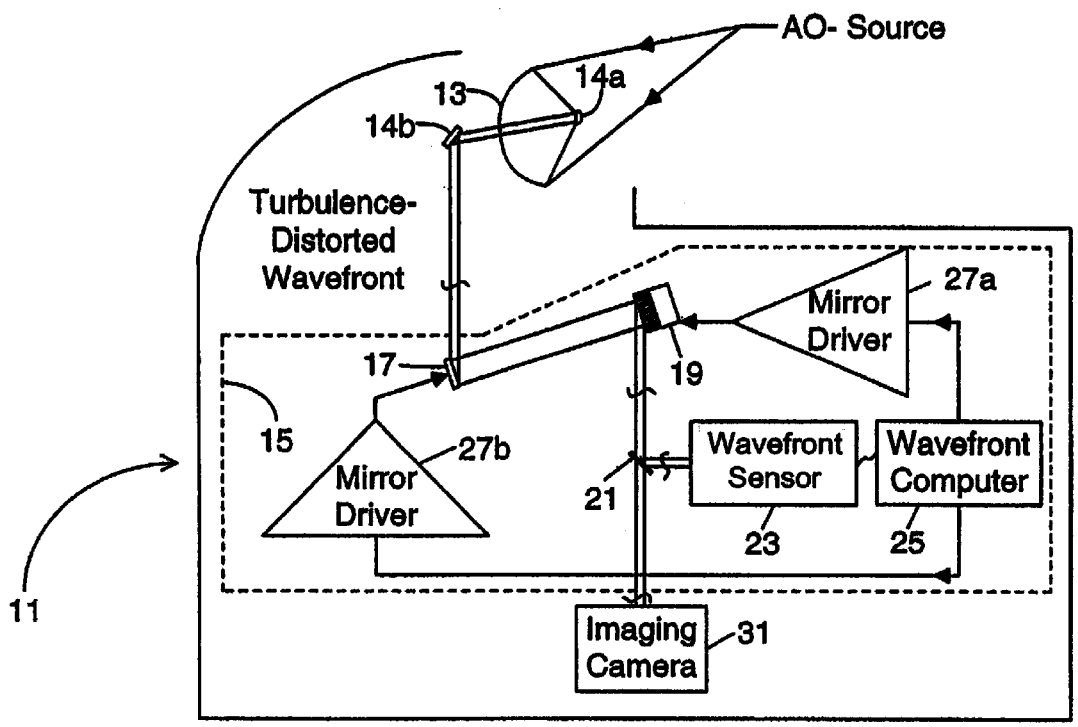
FIG. 1A shows a prior art large aperture space telescope and an adaptive optics system.
Figure 1B:
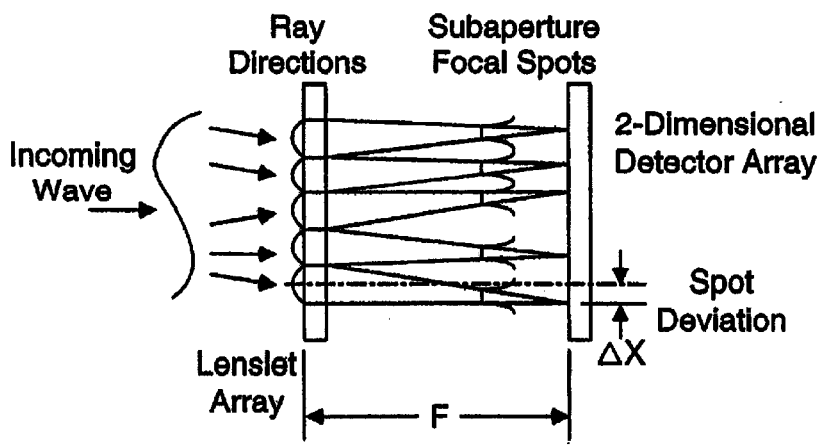
FIG. 1B shows a prior art Shack-Hartmann sensor utilized in the system of FIG. 1A.

Referring to the figures in the accompanying Drawings, the preferred embodiments of the present invention will now be described in great detail, wherein like elements will be indicated using like reference numerals.

Figure 2:
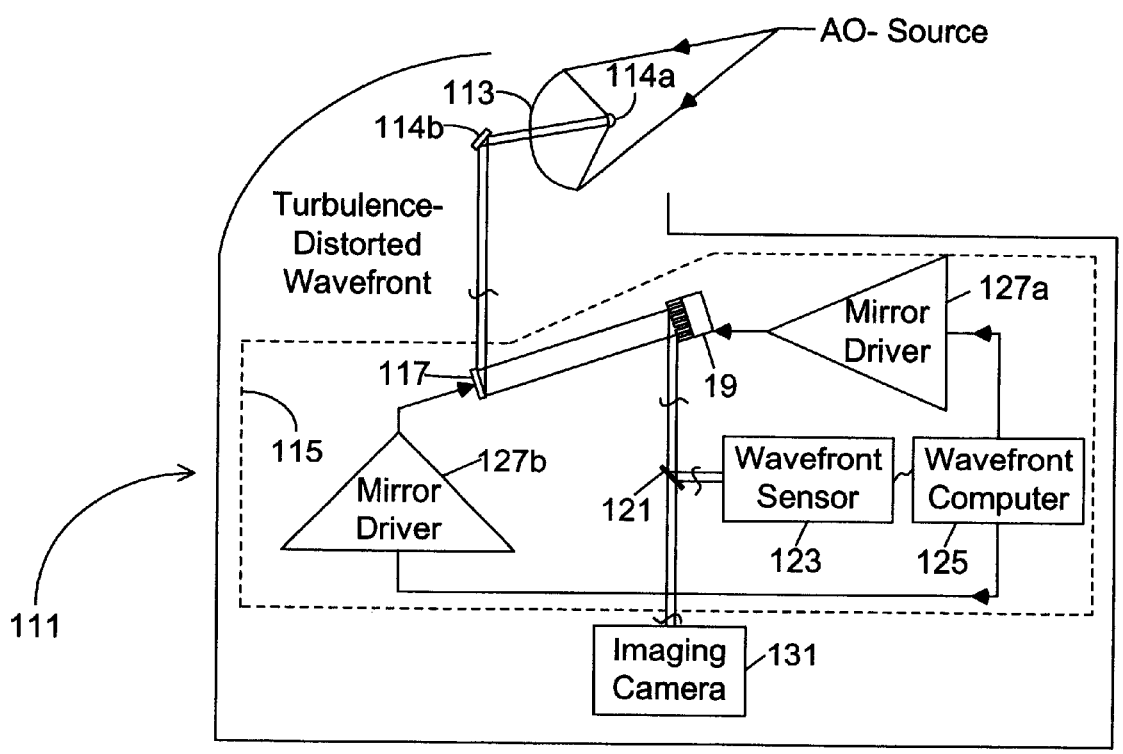
FIG. 2 shows a large-aperture space telescope embodying an adaptive optics subsystem of the present invention which is capable of measuring and correcting large wavefront phase errors free of 2π resolution ambiguity.

As shown in FIG. 2, light from a nominal point source above the atmosphere enters the primary mirror 113 of the telescope 111 and is focused and directed by mirrors 114A and 114B to an adaptive optics subsystem 115. The adaptive optics subsystem 115 includes a tilt mirror 117, a deformable mirror 19 disposed between its source (the mirrors 114A and 114B), and also an electronic imaging camera 131 for capturing an image of the normal point source. A beam splitter 121 directs a portion of the light directed to the imaging camera by the mirrors 117, 119 to a wavefront sensor 123 that measures the phase distortion in the wavefronts of light directed thereto using the novel wavefront sensing method of the present invention. A computer 125 cooperates with mirror driver 127A to control the tilt mirror 117 to stabilize the image of the point source, and cooperates with the mirror driver 127B to control the deformable mirror 119 so as to compensate for and correcting large phase distortions measured therein, substantially free of the $2\pi$ phase resolution ambiguity associated with prior art wavefront sensing techniques.

Long-baseline optical interferometers utilize a well known dispersed fringe technique (see, for example, Applied Optics vol. 35, #16, p. 3002). In the dispersed fringe system, the beams from two telescope apertures are combined in the pupil plane and brought to a common focus. If the path lengths from the two apertures are closely matched, there will be interference between the two beams and fringes will be formed. For any given wavelength this fringe pattern shifts with changing path difference but the pattern repeats for every one wavelength change in path. This is known as a $2\pi$ phase resolution ambiguity. If this focal spot is spectrally dispersed, then the fringe pattern as a function of wavelength may be recorded. Since the ambiguity in path difference is one wavelength at the measurement wavelength, by measuring at multiple wavelengths, it is possible to extend the unambiguous path difference measurement range very significantly.

According to the principles of the present invention, the wavefront sensing method employed in adaptive optics subsystem 115 generally comprises: using each subaperture of modified Hartmann sensor 123 to spatially sample incident light from the input beam and form a (far-field) dispersed spot image with a fringe pattern corresponding to each sample of incident light; and using an image camera 124 as part of sensor 123 to capture the image of the dispersed fring pattern and an associated image processor 125 to analyze spectral components of the dispersed fringe pattern in order to derive a measure of the local phase distortion in each sample of incident light, in a way which is substantially free of the $2\pi$ phase error ambiguity characteristic of prior art wavefront sensing techniques.

Figure 3A:
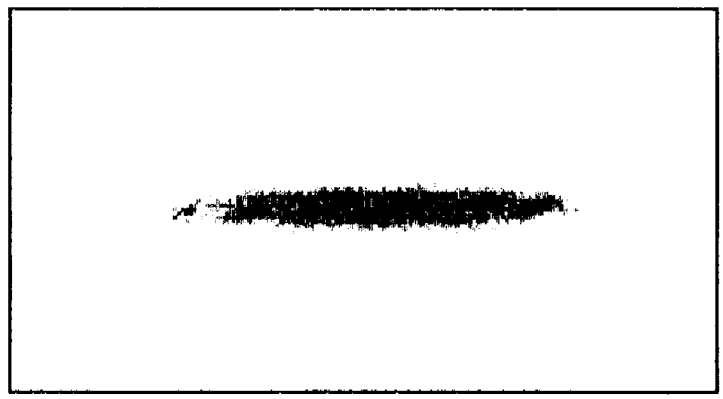
FIG. 3A shows an image of a dispersed spot (and the interference fringe pattern formed therein) as captured by the imaging device of the wavefront sensor of the present invention.
Figure 3B:
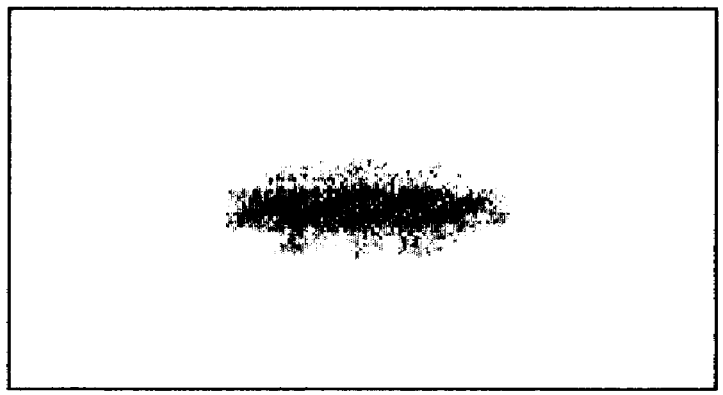
FIG. 3B shows a simulation of an image of a dispersed spot (and the interference fringe pattern formed therein) as captured by the imaging device of the wavefront sensor of the present invention

More specifically, each subaperture in the wavefront sensor of the present invention forms a unique image of a spatial sample of incident light. If that subaperture, for example, bridges the gap between the two segments of deformable mirrors 117, 119 in the adaptive optic subsystem 115, then a phase step may be introduced into a subaperture. In such a case, the two halves of the subaperture would be analogous to the two apertures of a long baseline interferometer, as disclosed in Applied Optics, Volume 35, No. 16, page 3002, wherein a dispersed fringe analysis technique is disclosed. In accordance with the principles of the present invention, if such a phase step occurs within a subaperture and the image is dispersed, then a very distinctive fringe pattern is formed, and by analyzing this dispersed fringe pattern, the size of the phase step can be determined without $2\pi$ phase error ambiguity. In FIG. 3A, a distinctive fringe pattern is shown, which closely parallels the simulation of the expected image shown in FIG. 3B from the arrangement of the wavefront sensor of the present invention in FIGS. 4A–4B and 5.

Referring to FIG. 5, the optical components comprising an exemplary wavefront sensor according to the present invention are schematically illustrated. The wavefront sensor comprises optical elements 117 that spatially sample incident light and form dispersed spots with a fringe pattern corresponding to samples of the incident light. As shown, wavefront sensor 123 further comprises electronic imaging device 124 (e.g., CCD camera) for recording the light transmitted through the optical elements 1503 to capture an image of the fringe pattern of such spots. The pupil plane is shown at 126. The wavefront sensor 123 further comprises image processor 127 for analyzing spectral components of the fringe pattern in the image captured by the imaging device 124 so as to derive a measure (that eliminates the $2\pi$ ambiguity) of the local phase distortions in the samples of incident light.

As illustrated in FIG. 5 and FIGS. 4A–4B, the optical elements 117 (that spatially sample incident light and form dispersed spots with fringe patterns corresponding to samples of the incident light) may comprise a transmission grating 110 (for example, with dimensions one inch square and 3 mm thick) and a lens array 115. The lens array 115 may include epoxy on glass (for example with dimensions one inch in diameter and 6 mm thick). Segment dividers, which illustrate the spatially partitioning of the subapertures of the lens array, are shown by a thick line as, for example, is indicated at 120. The grating direction is shown at 122. The pupil plane is shown at 126. In an alternate embodiment (not shown), the position of the grating 10 with respect to the lens array 115 may be juxtaposed such that grating 110 is adjacent to the pupil plane 126.

Figure 4C:
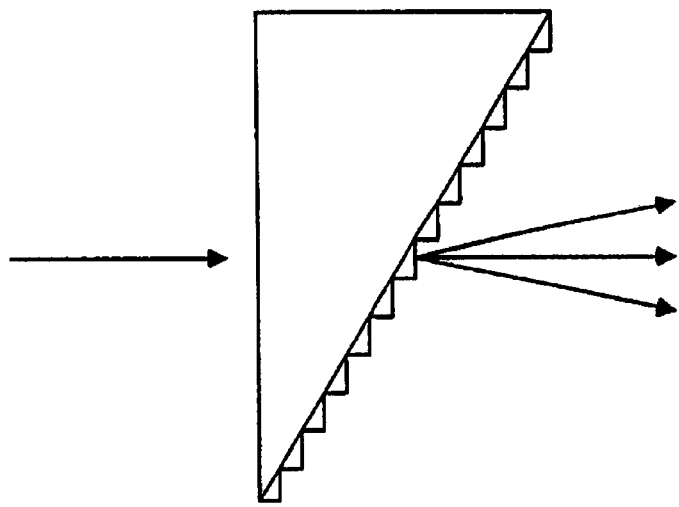
FIG. 4C is a schematic illustration of the optical characteristics of a grism utilizable in the wavefront sensor of the present invention.

Alternatively, the optical elements 117 of the wavefront sensor 123 of FIG. 5 may comprise one or more refractive optical elements (such as prisms) or one or more diffractive optical elements (such as a diffraction grating or hologram) or a combination of the two, e.g., a grism. A grism, or Carpenter prism, whose function is schematically illustrated in FIG. 4C, is a transmission grating mounted on a prism that together act to disperse incident light (along a predetermined dispersion direction) without deviating a component (its design wavelength) of the incident light. It is preferable that the optical elements 117 provide an independent dispersive direction (which is preferably aligned along the direction of the phase step to be measure) for each subaperture. Holographic gratings or an array of grism elements provide such independent dispersion directions. Optical elements with a singular dispersive direction may be used, but this complicates the analysis for phase steps that ran at an angle relative to the singular dispersion direction.

Figure 4D:
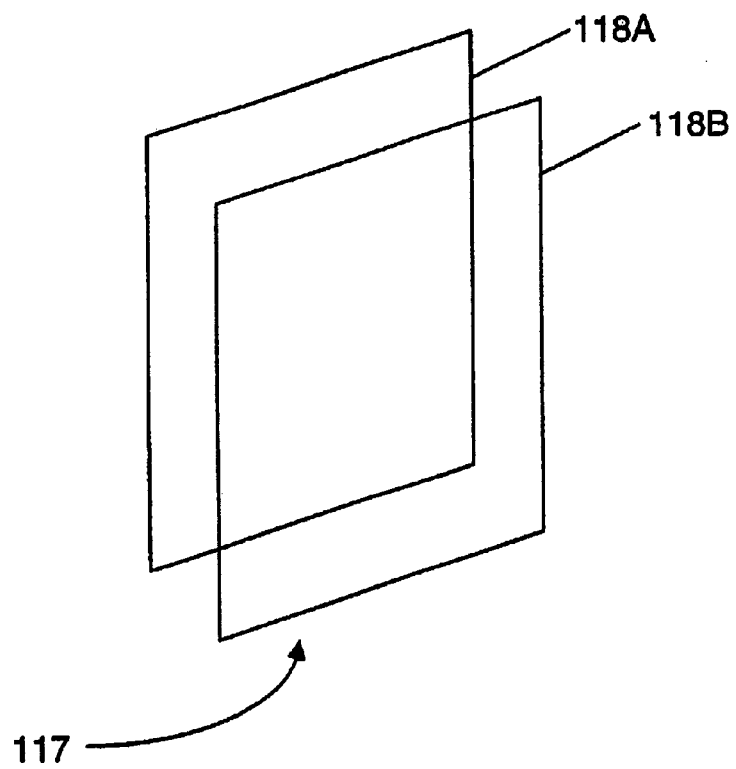
FIG. 4D is a schematic view of exemplary optical elements (i.e. first and second dispersing elements) employed in the wavefront sensor of the present invention, wherein the optical (elements spatially sample incident light, form far-field spots corresponding to samples of the incident light, and disperse the fringe pattern of such spots onto an electronic image sensor (i.e. camera).

Alternatively, as shown in FIG. 4D, the optical elements 117 of the wavefront sensor 100 of FIG. 5 may include a first dispersive element 118A (which may be a grism or grism array or hologram) that disperses incident light and a second dispersive element 118B that deviate the dispersed ray bundle formed by the first dispersive element 118A to produce the fringe pattern for measurement. The second dispersive element 118B may be realized as an array of prism elements, wherein each prism element includes a plurality of sub-elements that have slightly different tilt in the direction perpendicular to the dispersion direction of the first dispersive element 118A, which deviates the ray bundle formed by the first dispersive element so that the spectral components of the dispersed spot fringe pattern are separated in the image plane of the imaging device.

In addition, it is contemplated that the first and second dispersive elements 118A and 118B of the wavefront sensor 100 may be integrated into a single module.

This interferometric analog may be extended to understand the operation of illustrative embodiments of the wavefront sensor of the present invention. Just as in the dispersed fringe sensor, if the Hartmann spot is dispersed parallel to the edge of the phase step, we may observe the shape of the blur spot at many wavelengths. FIGS. 8A–8F show the results of a simulation of this arrangement. In this simulation, the dispersion is in the vertical direction and covers the range from 0.5 µm at the bottom to 1.0 µm at the top. Each image is the blur spot formed by a Hartmann lenslet that has been combined with a dispersive element.

Figures 6A, 6B, 6C:
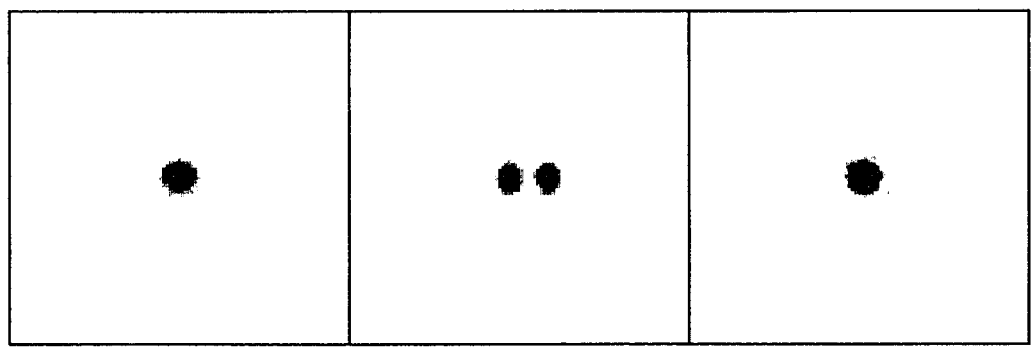
FIG. 6A shows a blur spot with a phase step of 0.2 wave, resolved by the wavefront sensor of the present invention.
FIG. 6B shows a blur spot with a phase step of 0.5 wave, resolved by the wavefront (sensor of the present invention.
FIG. 6C shows a blur spot with a phase step of 1.0 wave, resolved by the wavefront sensor of the present invention.
Figure 7:
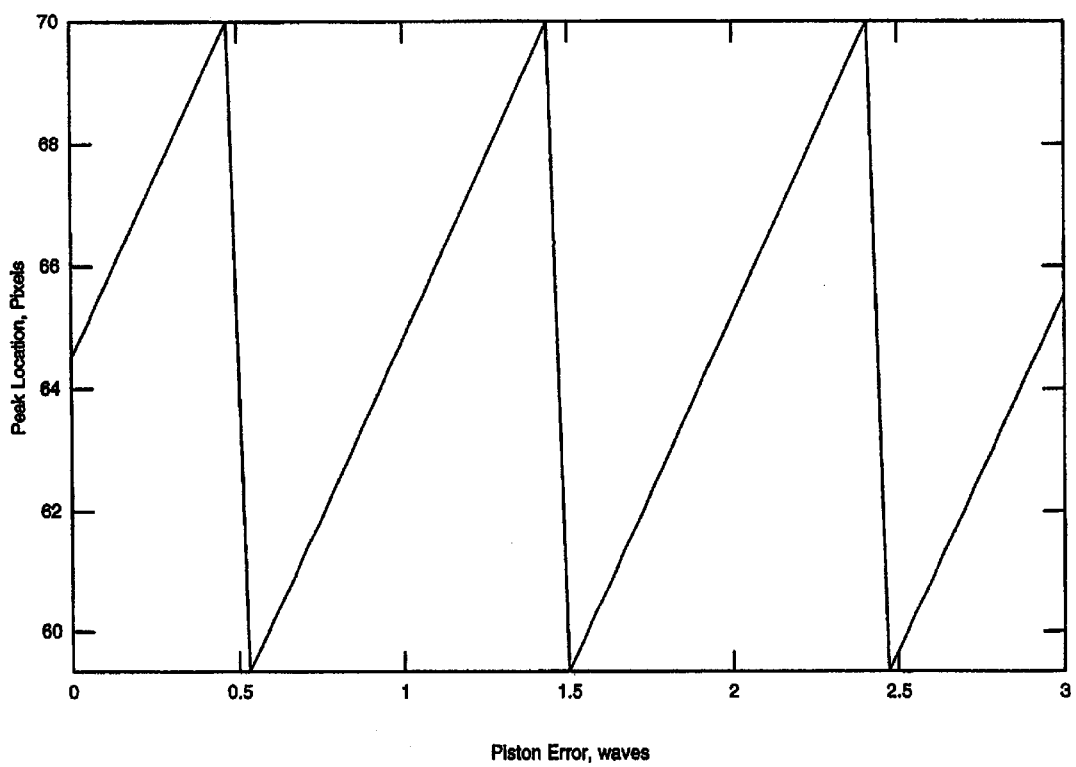
FIG. 7 is a graph illustrating how the position of the peak in the spatial frequency of the interference pattern of the blur spot changes relative to the phase step.
Figures 8A, 8B, 8C:
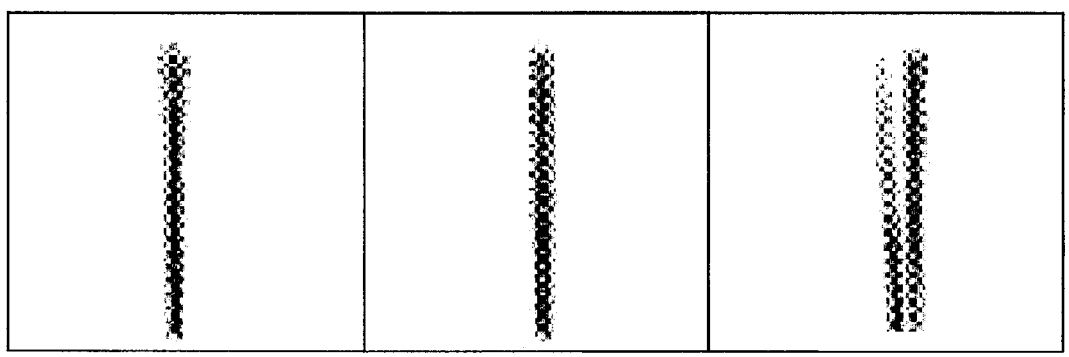
FIG. 8A shows a dispersed spot image captured by the imaging device of the wavefront sensor of the present invention, and having a phase difference of $0.0\mu$.
FIG. 8B shows a dispersed spot image captured by the imaging device of the wavefront sensor of the present invention, and having a phase difference of $0.1\mu$.
FIG. 8C shows a dispersed spot image captured by the imaging device of the wavefront sensor of the present invention, and having a phase difference of $0.3\mu$.
Figures 8D, 8E, 8F:
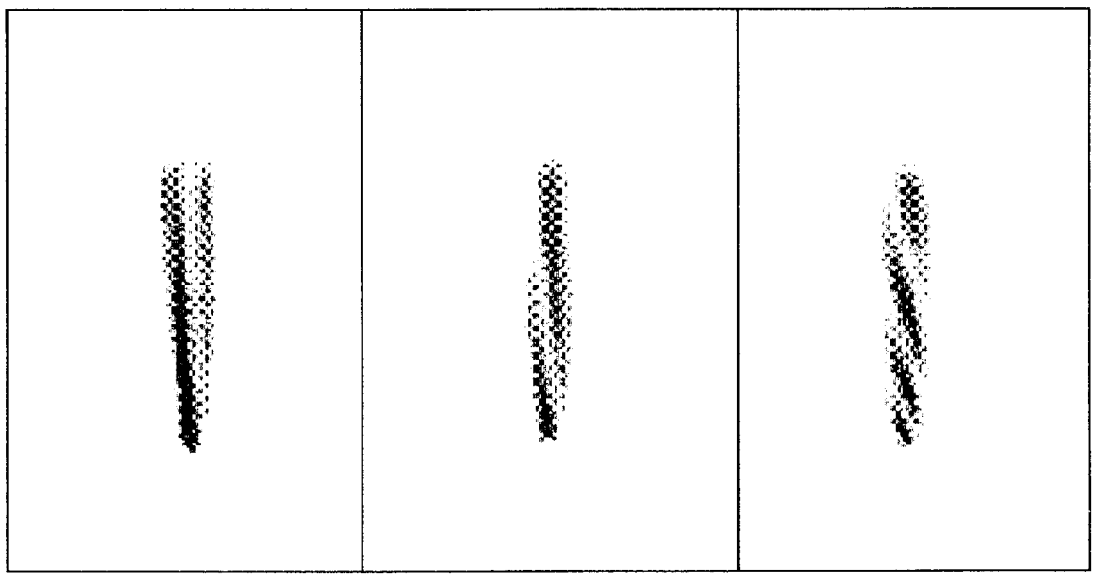
FIG. 8D shows a dispersed spot image captured by the imaging device of the wavefront sensor of the present invention, and having a phase difference of $0.5\mu$.
FIG. 8E shows a dispersed spot image captured by the imaging device of the wavefront sensor of the present invention, and having a phase difference of $1.0\mu$.
FIG. 8F shows a dispersed spot image captured by the imaging device of the wavefront sensor of the present invention, and having a phase difference of $3.0\mu$.

Slicing horizontally through each image (which is perpendicular to the direction of dispersion) produces blur spots similar to FIGS. 6A–6C. At each slice perpendicular to the dispersion, the light distribution is characteristic of the blur spot formed by a Hartmann sensor at one particular wavelength. As the size of the step increases away from zero, power is shifted from the central lobe of the spot to the side lobe. In addition, the position of the central lobe shifts. This shift is directly proportional to the size of the phase step. Unfortunately, once the phase step reaches ½ wave, the "side lobe" becomes the brighter lobe. Thus, using the position of the brighter lobe suffers from the same $2\pi$ ambiguity as the interferometer.

As illustrated in FIG. 5, the wavefront sensor 123 of the present invention includes imaging device 124 (e.g., CCD camera or CMOS camera) that captures an image of the fringe pattern distributed along the dispersion direction by the dispersive elements 117, and image processing device 127 that analyzes the spectral components of the fringe pattern to derive a measure (that eliminates the $2\pi$ ambiguity) of the local phase distortion in the corresponding sample of incident light. Preferably, the image processing device 127 analyzes the spatial frequency of the spectral components of the fringe pattern to derive a measure (that eliminates the $2\pi$ ambiguity) of the local phase distortion in the corresponding sample of incident light. FIG. 12 illustrates exemplary operations of the image processing device in analyzing the spatial frequency of the spectral components of the fringe pattern to derive a measure (that eliminates the $2\pi$ ambiguity) of the local phase distortion in the corresponding sample of incident light.

Figure 9:
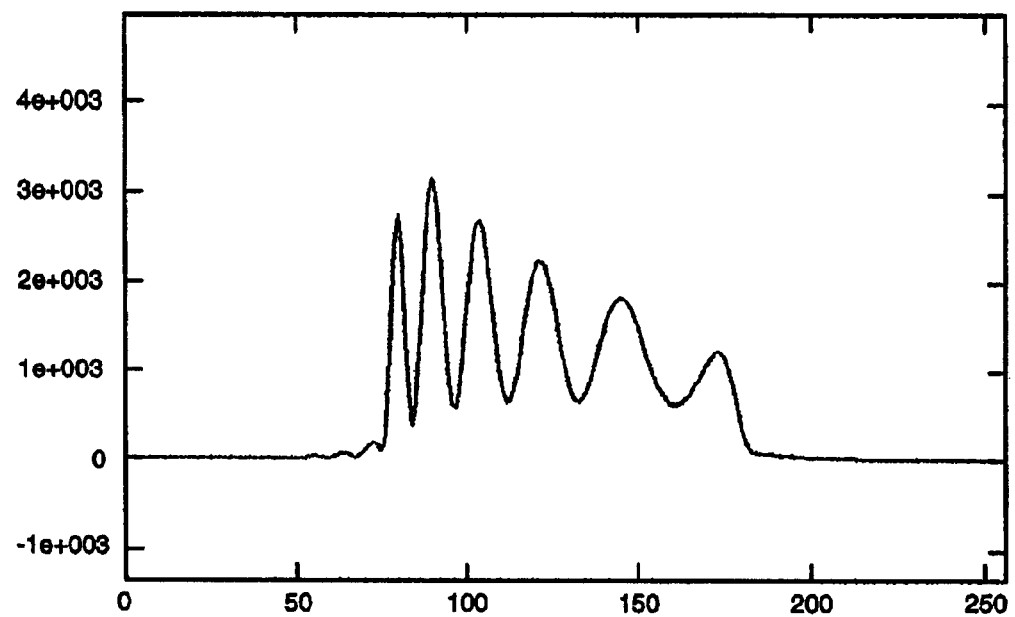
FIG. 9 shows the intensity values of a slice (along the dispersion direction) through a dispersed spot image captured by the imaging device of the wavefront sensor of the present invention.

Note that by examining the behavior of the light distribution along the dispersion direction, the wavefront sensor 100 derives a measure of phase distortion without ambiguity (e.g., the $2\pi$ ambiguity is resolved). For example, a slice through the image of such light distribution along the dispersion direction yields an intensity profile that is exactly analogous to the output of the dispersed fringe sensor. Such a slice produced by a simulation is shown in FIG. 9.

The wavefront sensor of the present invention 123 shown in FIGS. 2 through 5 and as described above is preferably operated in two modes. The first mode of operation is used when the estimated phase step error is large (e.g., greater than ½ wave), and provides a coarse measure of phase distortion without ambiguity (e.g., the $2\pi$ ambiguity is resolved). The second mode of operation is used when the phase step is small (e.g., less than ½ wave), and provides a finer measure of such phase distortion. In the first mode of operation, slices (along the direction of dispersion) in the image of the fringe pattern are analyzed to yield an estimate of the phase error. This estimate is used to correct the error until the size of the step is reduced below ½ wave. At this point, the second mode of operation is used. In the second mode of operation, slices (perpendicular to the direction of dispersion) of the image of the fringe pattern are analyzed to the measure the phase error with greater accuracy, which is used to further reduce the phase step error. Simulations indicate that measurement of phase step errors of less than ¹⁄₅₀ wave should be possible. This one sensor then combines both the coarse and fine phase measurement capability in one monolithic optical instrument.

Figure 12A:
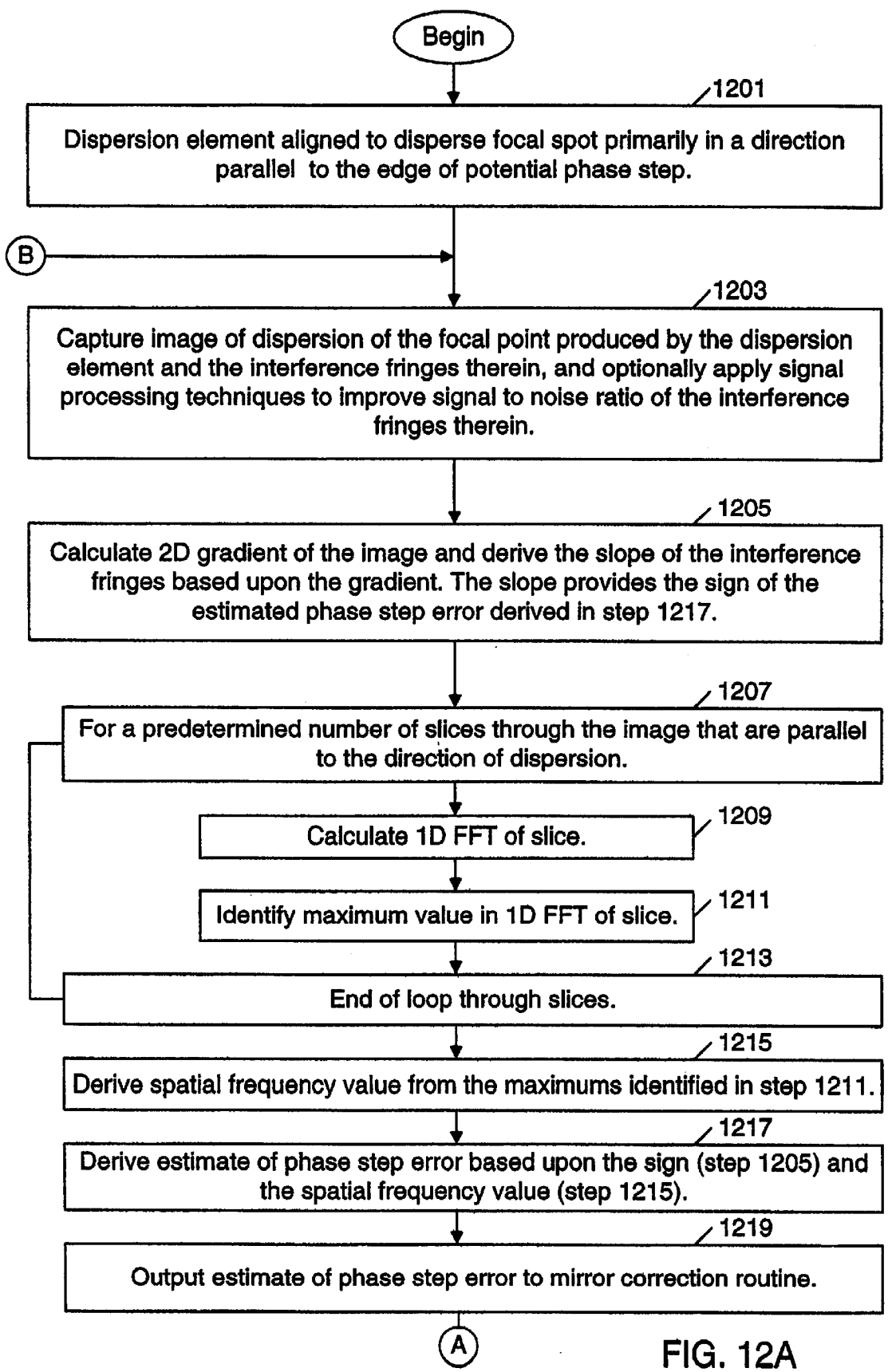
FIGS. 12A and 12B, taken together, set forth a flowchart illustrating exemplary operations of the wavefront sensor of the present invention when performing both coarse and fine phase measurement for a given subaperture.
Figure 12B:
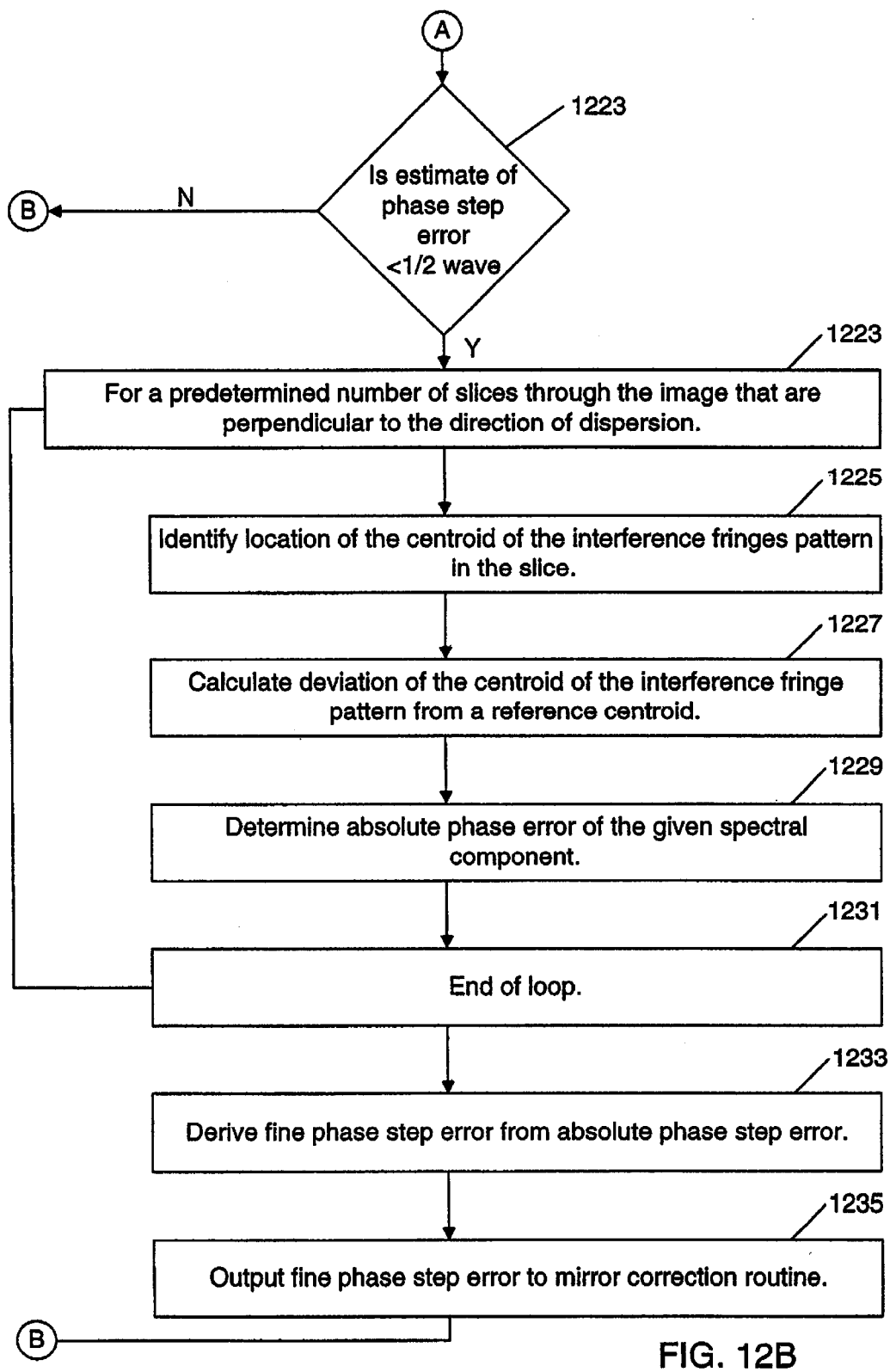

FIGS. 12A and 12B illustrate a more detailed description of exemplary operations of the wavefront sensor of the present invention 123 in performing both coarse and fine phase measurement for a given subaperture. In step 1201, the optical elements that form the far-field fringe pattern for a given subaperture (e.g., dispersion element) are aligned such that dispersion occurs primarily in a direction parallel to the edge of a potential phase step. In step 1203, the imaging device 124 captures an image of the fringe pattern (which corresponds to the spectral components of the dispersed far-field spot) for the given aperture. Optionally, image processor 127 may apply image processing techniques (such as filtering, contrast enhancement, etc) to improve the signal-to-noise ratio of the interference fringe therein.

In step 1205, the image processor 127 calculates a two-dimensional gradient of the image produced in step 1203 and derives slope of the fringe pattern from the gradient values. This slope provides the sign of the course estimate of phase step error as derived in step 1217.

In steps 1207–1213, a loop is performed over a predetermined number of slices (that are parallel to the direction of dispersion for the given subaperture) through the image produced in step 1203, wherein steps 1209 and 1211 are performed for each "parallel" slice. In step 1209, a fast fourier transform (FFT) is performed on the intensity values of the slice; and, in step 1211, a maximum value (corresponding to the peak spatial frequency of the spectral components in the fringe pattern) in the FFT of the slice is identified. After the loop 1207–1213 ends, operation continues to step 1215.

In step 1215, a spatial frequency value is derived from the maximums identified in step 1211 (for example, by calculating the average of such maximums). This spatial frequency value characterizes the spatial frequency of the spectral components in the fringe pattern.

In step 1217, a course estimate of the phase step error is derived from the sign (identified in step 1205) and the spatial frequency value calculated in step 1215. Because the phase step error is directly proportional to the spatial frequency of the spectral components in the fringe pattern, this operation preferably includes a multiplication of the spatial frequency value (calculated in step 1215) by a constant. Note that the $2\pi$ ambiguity is resolved in this measurement.

In step 1219, the coarse estimate of phase step error is output to a mirror correction routine to correct for this error and the operation of the first mode ends.

In step 1221, it is determined if the second mode of operation (e.g., the phase step error is less than ½ wave) for fine phase error measurement should be entered. If not, the operation returns back step 1203 to perform course phase measurement and correction; if so, the operation continues to perform a loop 1223–1231.

Loop 1223–1231 performs a loop over a predetermined number of slices (that are perpendicular to the direction of dispersion) through the image as produced in step 1203 wherein the operations of steps 1225, 1227 and 1229 are performed.

In step 1225, the image processor 127 identifies the location of the centroid of the fringe pattern within the slice. In step 1227, the image processor 127 calculates deviation of the centroid (calculated in step 1225) from location of a geometric null (e.g., location of a reference centroid measured by the same analysis of the fringe pattern from a reference source). This deviation provides a measure of the phase error for a given spectral component (wavelength) as a function of the wavelength of the spectral component. In step 1229, the wavelength corresponding to the phase error measured in step 1227 is identified, and this wavelength is used to convert such phase error to an absolute phase error value for the given spectral component This operation involves mapping the pixel coordinates of the slice to a wavelength. Such mapping is preferably accomplished in a calibration phase, whereby the wavefront sensor 123 is illuminated with a source with predetermined spectral components. The image processor 127 identifies such predetermined spectral components in its image plane (pixel coordinates), determines a mapping between pixel coordinates and wavelength, and stores such mapping in persistent storage for subsequent use.

After the loop ends in step 1231, the operation continues in step 1233 wherein the image processor 127 derives a fine phase step error from the absolute phase errors (step 1229) for the slices, for example, by averaging the absolute phase errors.

In step 1235, the image processor 127 outputs the fine phase step error to a mirror correction routine that corrects for the fine phase step error, and returns to the first mode of operation in step 1203.

The wavefront sensor of the present invention 123 as described above is preferably used as part of an adaptive optic system as illustrated in FIG. 2. The wavefront sensor 123 measures the phase distortion in the wavefronts of light directed thereto, and operates in conjunction with a computer 125 and mirror drivers to control one or more mirrors (such as tilt mirror 117 and deformable mirror 119 to compensate for the phase distortions (i.e. errors) measured therein.

Figure 10:
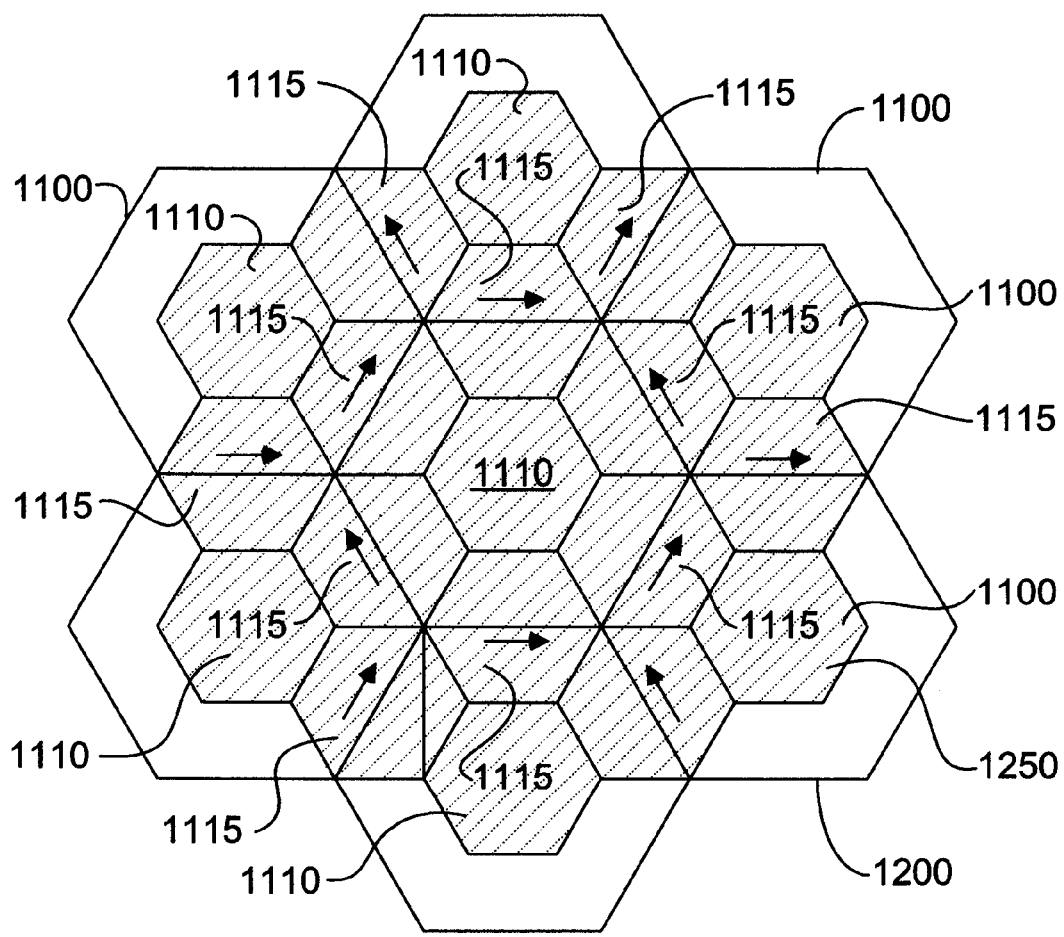
FIG. 10 is a schematic representation of an adaptive optic subsystem according to the present invention, providing a schematic view of the geometric arrangement of the apertures of its wavefront sensor, overlaid onto the segments of a multi-segmented deformable mirror employed in the subsystem.

FIG. 10 illustrates an exemplary embodiment of an adaptive optic system according to the present invention. It provides a schematic view that shows the geometric arrangement of the apertures of the wavefront sensor overlaid onto the segments of a multi-segmented deformable mirror. The bottom layer represents the segments of the deformable mirror. As shown there are seven large hexagons 1100, with six large hexagons arranged around the seventh, each of which is a mirror, or mirror segment. We use the term "mirror" to refer to the overall surface that is composed of individual "mirror segments." Here it is assumed that the mirror to be phased consists of hexagonal segments, although other shapes also work. The top layer 250 represent the apertures of the wavefront sensor 123. As shown there are nineteen (19) subapertures, each of which is hexagonal in shape. There are two types of subapertures shown here. A first type of apertures 1115 (referred to as "dispersed Hartmann apertures") 1115 form far-field spots corresponding to samples of the incident light and disperse the fringe pattern of such spots as discussed above. A second type of apertures 1110 (referred to "normal Hartmann aperture") do not perform dispersion. Arranged around the six edges of the center mirror segment are six dispersed Hartmann apertures 1115 that are used to measure the piston difference to adjacent mirror segments from the center mirror segment. Additional dispersed Hartmann subapertures 1115 are located between the centers of the other mirror segments. In the center of each mirror segment is a normal Hartmann subaperture 1110 used to measure the tilt of the segment. This single subaperture may be replaced by many smaller subapertures if the segment requires figure measurement or control. This hybrid optical element would preferably be fabricated as a single unit with holographic gratings and refractive lenslets. It could be mounted in a retractable holder in a pupil plane of the telescope system. The resulting images would be captured by imaging camera 131.

Figure 11A:
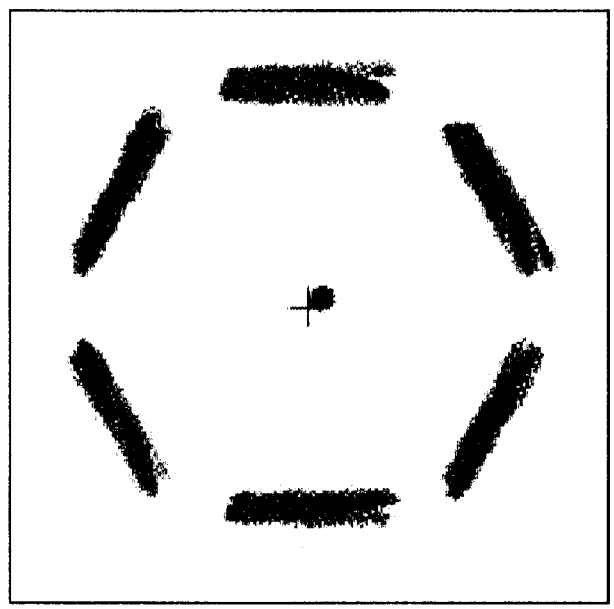
FIG. 11A is a simulated image produced from the geometric arrangement of FIG. 10, showing piston and tilt errors between the center and outer segments, of the deformable mirror of the adaptive optics subsystem.
Figure 11B:
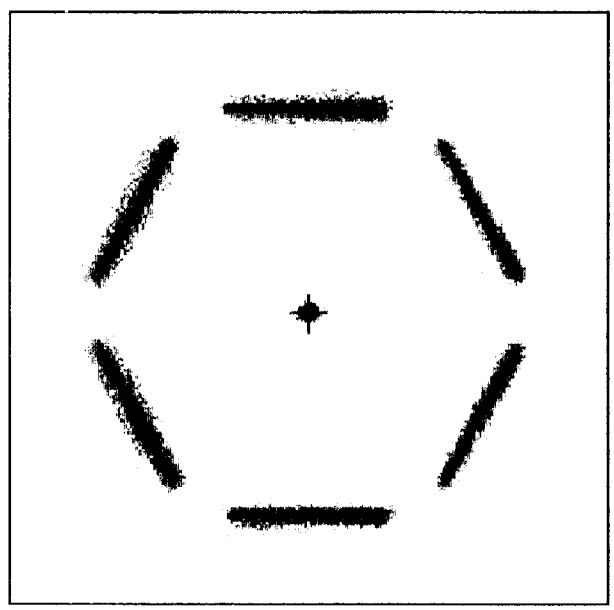
FIG. 11B is a simulated image from the geometric arrangement of FIG. 10, showing no piston and tilt errors between the center and outer segments, of the deformable mirror of the adaptive optics subsystem.

The procedure for aligning and phasing this set of segments begins by using the central subaperture tip and tilt error signals to point the segment correctly. The tilt alignment is performed by deforming the mirror segment so that it tilts in the proper direction. Phase alignment is performed by moving a piston attached to the back of the segment and changing the height of the segment. The goal is to make all parts of the incoming wave as shown in FIG. 2 reach the mirror segments at the same time and at the same angle. It is here assumed that a suitable reference position for each segment has been defined. Once the tilt error is minimized, the six dispersed sensors 1115 are used to measure the piston differences. Initially, the along dispersion data are used to reduce the piston to a value below ½ wave, then the cross dispersion data are used to reduce the piston error to a very low limit. FIG. 11A shows a simulation of the image formed by this arrangement of subapertures for the case in which the central segment is both stilted and pistoned with respect to the others. FIG. 11B shows the case in which the segments are properly phased.

Figure 13:
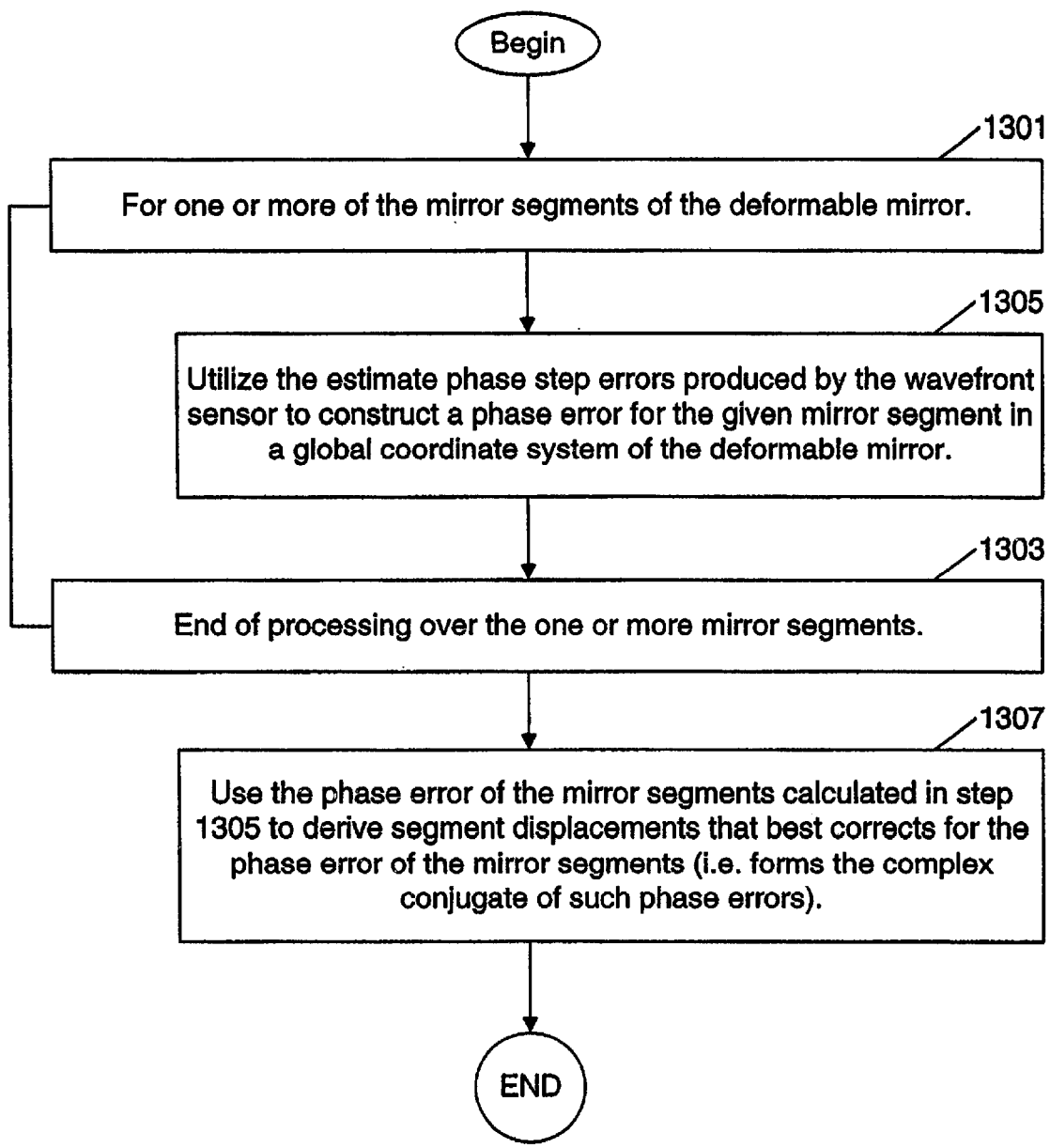
FIG. 13 is a flow chart illustrating an exemplary mirror correction scheme utilized by the adaptive optic system of FIG. 10, for controlling the displacement of mirror segments in the system in order to correct for the phase errors measured during wavefront sensing operations.

FIG. 13 illustrates an exemplary mirror correction scheme utilized by the adaptive optic system of FIG. 10 to control displacement of the mirror segments to correct for the phase errors provided by wavefront sensing operations. In step 1301, a loop is performed over one or more of the mirror segments of FIG. 10. Step 1305 is performed for each given segment in the loop. In step 1305, the estimated phase step errors produced by the wavefront sensor 123 that correspond to the given segment (including those phase step errors corresponding to its edges) are used to construct a phase error for the given mirror segment in a global coordinate system of the deformable mirror. The loop ends in step 1303 and operations continue to step 1307 wherein the phase error of the mirror segment(s) calculated in step 1305, which are represented in the global coordinate system of the deformable mirror, is used to derive segment displacements that best corrects for such phase error (i.e., forms the complex conjugate of such phase errors).

In addition, the improved wavefront sensor 123 and adaptive optic subsystem as described above is preferably used as part of a large aperture space telescope as illustrated in FIG. 2. Because of the large dynamic range of the wavefront sensor and its ability to perform wavefront measurement without ambiguity, it is ideally suited to performed course adjustment of a large aperture space telescope to thereby correct for large phase steps that are initially present within such systems.

Moreover, because of the large dynamic measurement range of the wavefront sensor, it can operate effectively in highly turbulent transmission mediums. Moreover, wavefront measurements for all segments can be made simultaneously using a single image of the wavefront.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following Claims to Invention.

What is claimed is:

1. A wavefront sensor for characterizing phase distortions in incident light, said wavefront sensor comprising:

optical elements for spatially sampling the incident light and forming a dispersed spot with a fringe pattern corresponding to samples of the incident light;

an imaging device for capturing an image of the dispersed spot with said fringe pattern being formed by said optical elements; and an image processor for analyzing the spectral components of the fringe pattern of a given dispersed spot so as to derive a measure of the local phase distortion without ambiguity in the corresponding sample of incident light.

2. The wavefront sensor of claim 1, wherein said image processor analyzes the spatial frequency of the spectral components of the fringe pattern of a given dispersed spot so as to derive a measure of the local phase distortion without ambiguity in the corresponding sample of incident light.

3. The wavefront sensor of claim 1, wherein said optical elements comprise a transmission grating and a lens array.

4. The wavefront sensor of claim 1, wherein said optical elements comprise a refractive element.

5. The wavefront sensor of claim 1, wherein said optical elements comprises a diffractive element.

6. The wavefront sensor of claim 1, wherein said optical elements comprises a diffractive element and a refractive element.

7. The wavefront sensor of claim 1, wherein said optical elements comprises a grism.

8. The wavefront sensor of claim 1, wherein said optical elements comprise an array of prism elements.

9. The wavefront sensor of claim 1, wherein said optical elements comprises a grating.

10. The wavefront sensor of claim 1, wherein said optical elements comprise a hologram.

11. The wavefront sensor of the claim 1, wherein said image processor examines slices in the captured image that correspond to a predetermined dispersion direction to thereby to derive a measure of the local phase distortion without ambiguity in a sample of incident light.

12. The wavefront sensor of claim 11, wherein said slices are parallel to said predetermined dispersion direction.

13. The wavefront sensor of claim 11, wherein said slices are perpendicular to said predetermined dispersion direction.

14. The wavefront sensor of claim 11, wherein the predetermined dispersion direction corresponds to a potential phase step in the incident light.

15. The wavefront sensor of claim 14, wherein the predetermined dispersion direction is parallel to a potential phase step in the incident light.

16. The wavefront sensor of claim 11, wherein the predetermined dispersion direction corresponds to a boundary between adjacent mirror segments in a deformable mirror that shapes the incident light.

17. The wavefront sensor of claim 16, wherein the predetermined dispersion direction is parallel to said boundary.

18. The wavefront sensor of claim 1, wherein said optical elements comprise al array of grisms.

19. The wavefront sensor of claim 18, wherein said array of grisms have varying dispersion directions.

20. An adaptive optic subsystem, including the wavefront sensor of claim 1, and a multi-segmented deformable mirror.

21. The adaptive optic system of claim 20, wherein the measurements of the wavefront sensor are used to measure phase steps at the boundary between mirror segments, and to correct such mirror segments.

22. A large aperture space telescope, including the adaptive optic subsystem of claim 20.

23. The large aperture space telescope of claim 22, wherein the wavefront sensor is used to perform course adjustment of the telescope to correct for initial large phase steps.

24. An optical system comprising a set of mirrors for focusing and directing incident light from a point source above the atmosphere causing phase distortion in the wavefront of said incident light, said optical system comprising; and an adaptive optics subsystem including an imaging camera for capturing an image of said point source, using said incident light;

a tilt mirror and a deformable mirror disposed between said set of mirrors and said imaging camera;

a wavefront sensor for measuring the phase distortion in the wavefront of said incident light using a wavefront sensing method which is substantially free of $2\pi$ phase resolution ambiguity;

a beam splitter for directing a portion of said incident light to said tilt and deformable mirrors and said wavefront sensor;

a first mirror driver for controlling said tilt mirror to stabilize said image;

a second mirror driver for controlling said deformable mirror so as to compensate for and correct phase distortions measured in the wavefront of said incident light forming said image, wherein said corrected phase distortions are substantially free of said $2\pi$ phase resolution ambiguity; and a computer cooperating with said first and second drivers and said wavefront sensor and controlling components within said optical system.

25. The optical system of claim 24, wherein said optical system is a space telescope.

26. The optical system of claim 24, wherein said wavefront sensor further comprises an optical device for spatially sampling said incident light and forming an image of a dispersed spot with a fringe pattern corresponding to the samples of said incident light, and an image processor for processing the image of said dispersed spot with the fringe pattern, and analyzing the spectral components of the fringe pattern produced by said wavefront sensor, so as to derive a measure of the local phase distortion without ambiguity in the corresponding sample of incident light.

27. The optical system of claim 26, wherein said image processor analyzes the spatial frequency of the spectral components of said fringe pattern to derive a measure of the local phase distortion without phase ambiguity in the corresponding sample of incident light.

* * * * *